United States Patent [19]

Peinemann

[11] Patent Number: 5,337,975
[45] Date of Patent: Aug. 16, 1994

[54] BREATHING SYSTEM FOR HYPERSONIC AIRCRAFT

[75] Inventor: Manfred K. A. Peinemann, Westlake Village, Calif.

[73] Assignee: Rockwell International Corporation, Seal Beach, Calif.

[21] Appl. No.: 843,343

[22] Filed: Feb. 28, 1992

[51] Int. Cl.$^5$ .............................................. B64D 33/02
[52] U.S. Cl. ................................................. 244/53 B
[58] Field of Search ................. 244/53 R, 53 B, 74, 244/73; 60/263, 269, 270.1, 214, 224, 225

[56] References Cited

U.S. PATENT DOCUMENTS 3,105,661 10/1963 Ferri ................................. 60/270.1
3,161,379 12/1964 Lane .................................. 244/53 B
3,324,660 6/1967 Lane et al. ............................ 60/244
3,347,496 10/1967 Opfer, Jr. ........................... 244/53 B
4,185,457 1/1980 Parker et al. ...................... 60/270.1
4,934,632 6/1990 Kim .................................. 60/270.1

*Primary Examiner*—Galen L. Barefoot
*Attorney, Agent, or Firm*—H. Fredrick Hamann; Harry B. Field; Steven E. Kahm

[57] ABSTRACT

In an aircraft having an integrated turbo-ramjet engine system for hypersonic flight there is provided an air breathing system having an air intake arrangement which can be selectively functioned to supply air to the turbo-ramjet engine system when the aircraft transitions from a turbo-propulsion mode to a ramjet-propulsion mode and back to a turbo-propulsion mode.

1 Claim, 3 Drawing Sheets

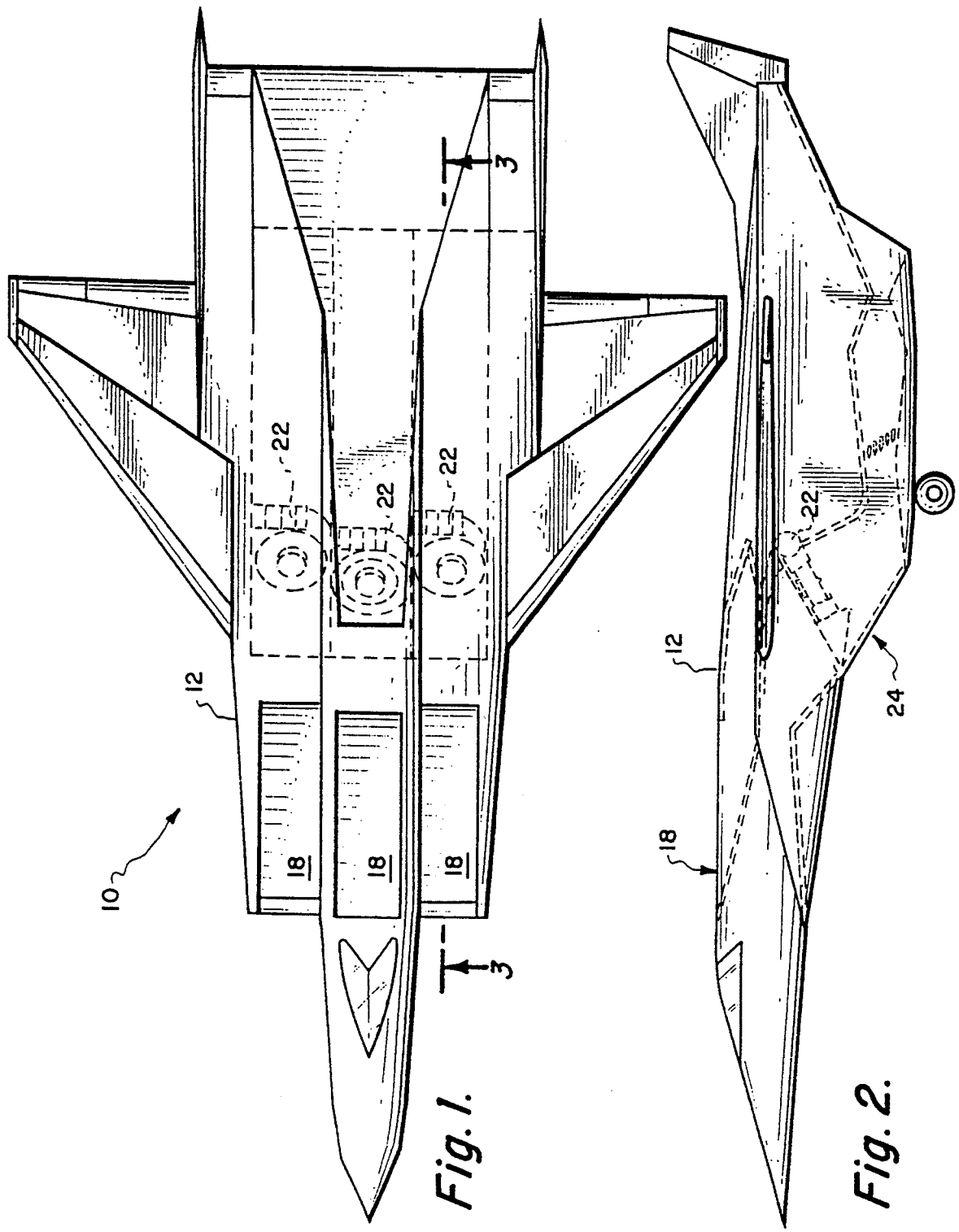

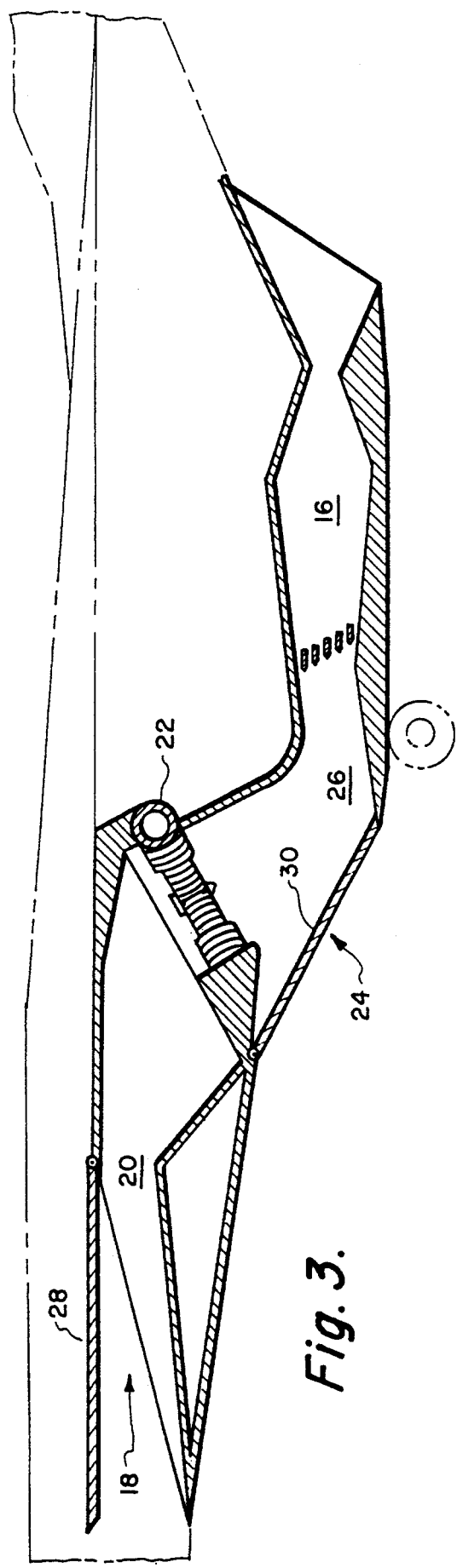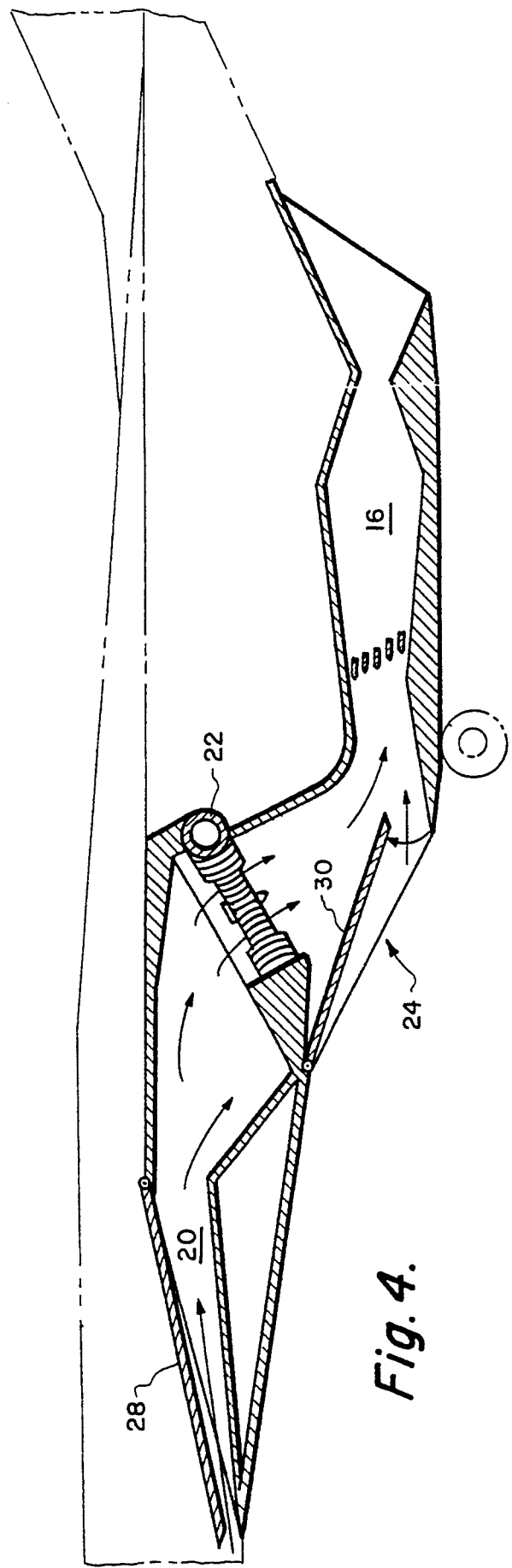

BREATHING SYSTEM FOR HYPERSONIC AIRCRAFT

FIELD OF THE INVENTION

The invention relates to an air breathing system in an aircraft provided with an integrated turbo-ramjet engine for hypersonic flight.

BACKGROUND OF THE INVENTION

Ramjets and scramjets (supersonic combustion ramjets) are airbreathing propulsion systems which can propel both manned and unmanned flight vehicles at hypersonic speeds, far beyond the speed range where turbofans and turbojets are no longer viable. Below Mach 3, however, ramjets are inefficient and indeed are incapable of accelerating a vehicle from rest. In order to operate in this flight regime, ramjet/scramjet powered vehicles require a separate low speed propulsion system, which operates either separately from the ramjet or is integrated with it in some fashion to provide a combined cycle propulsion system which can operate in different modes in different flight regimes. A problem with either approach to date has been a large drag penalty associated with increasing the vehicle diameter to accommodate two or more types of propulsion systems and/or the drag resulting from having exposed turbomachinery components in the flow path. Both penalties become unacceptable at very high Mach numbers.

OBJECTS OF THE INVENTION

It is, therefore, an object of the present invention to provide an air breathing system associated with the aircraft to optimize air flow intake and utilization with increasing flight speeds from the subsonic range into the hypersonic range.

Other objects, advantages and novel features of the present invention will become apparent from the following detailed description of the invention when considered in conjunction with the accompanying drawings.

FIG. 1 is a plan view of an aircraft having an integrated turbo-ramjet engine system and air breathing system associated therewith.

FIG. 2 is a cross-sectional view of a hypersonic aircraft according to the present invention.

FIG. 3 is a detailed cross-sectional view of the air breathing system associated with the hypersonic aircraft.

FIG. 4 is a cross-sectional view depicting a transition in the operation of the air breathing system.

DETAILED DESCRIPTION AND PREFERRED EMBODIMENT OF THE INVENTION

Figure 5:
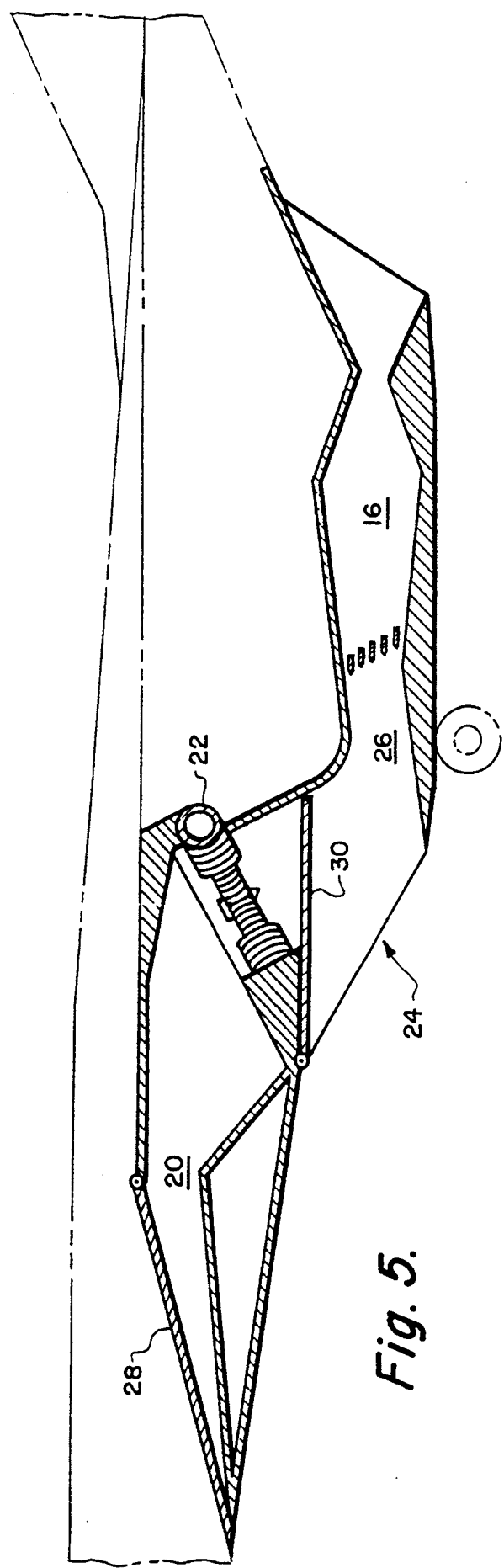
FIG. 5 is a cross-sectional view of the hypersonic aircraft with the air breathing system configured for hypersonic operation.

FIG. 1 depicts an embodiment of the invention wherein an aircraft 10 is provided with upper surface inlets 18 in the aircraft body 12 in communication with air compressors 22 whose operation in concert with an integrated turbo-ramjet system will be discussed in greater detail below.

FIG. 2 is a cross-sectional view of the hypersonic aircraft 10 depicting the cooperative relationship between the upper surface inlets 18, air compressor 22 and lower surface inlets 24 for controlling and directing air flow into the engine system for utilization in a combustion chamber area 16 of the aircraft.

As shown in FIG. 3, taken along line 3—3 of FIG. 1, upper surface inlet 18 communicates with an air flow channel 20 having provided at a distal end, air compressor 22.

Compressor 22 may be powered by a tip turbine driven by either a separate gas generator or by the expansion of the fuel previously heated by passage through a heat exchanger in the walls of the engine in a typical expander cycle mode.

Adjacent the dorsal or upper surface of the air flow channel 20, there is provided a first panel means flap 28. Beneath the air compressor 22 is a lower surface inlet 24 communicating with air flow channel 26. In FIG. 3, a second panel means flap 30 is shown. As shown in FIG. 3, the first panel means flap 28 is shown in a retracted or open position while second panel means flap 30 is in a closed position which would preclude the intake of air into air flow channel 26 via inlet 24. This configuration would be utilized by the aircraft in subsonic operations.

In FIG. 4, the air breathing system associated with the body of the aircraft is being functioned such that air flow entering air flow channel 20 by way of the upper surface inlet 18 passes through air compressor 22. During transition to ramjet operation, the first flap 28 is in a descending mode while the second panel means flap 30 is in an ascending mode. Control systems associated with air compressor 22, flap 28 and flap 30 for controlling the coordinated function thereof will be apparent to one skilled in the art.

FIG. 5 depicts the aircraft air breathing system as having transitioned from an operational configuration for subsonic flight to one of hypersonic flight. In this configuration, upper inlet flap 28 is in a closed or descended position while lower inlet flap 30 is in a open position, shielding the downstream side of compressor 22 while allowing air to enter intake 24, air flow channel 26 and ultimately combustion chamber area 16 where the air is mixed and burned with fuel, allowing the ramjet phase of operation to proceed. It is understood, of course, that in this configuration, air compressor 22 is not in operation and would not be required until the aircraft transitions from hypersonic to subsonic flight.

Although the invention has been described with reference to a specific embodiment, it would be appreciated that it is intended to cover all modifications and equivalents within the scope of the appended claims.

What is claimed is:

1. In an aircraft having a body and an integrated turbo-ramjet engine system for hypersonic flight, said aircraft further having an air breathing system associated with said body and said engine system, which comprises:

an upper aircraft body surface inlet communicating in downstream flow orientation with an upper flow channel, an air compressor and a combustion chamber; and a lower aircraft body surface inlet communicating in a downstream flow orientation with a lower air flow channel and then directly with said combustion chamber bypassing said air compressor and wherein said upper and said lower aircraft body surface inlets are functionally associated so that air is selectively injected into said combustion chamber through said upper inlet during subsonic flight, said lower inlet during supersonic flight or both simultaneously during transition.

* * * * *